G. A. MENENDEZ.
BRAKE MECHANISM FOR WEB ROLLS.
APPLICATION FILED APR. 14, 1909.
1,028,244.
Patented June 4, 1912.
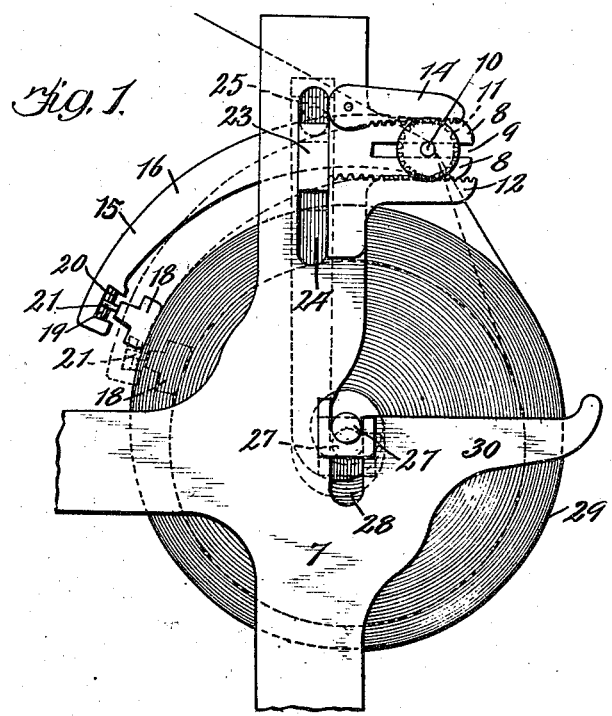
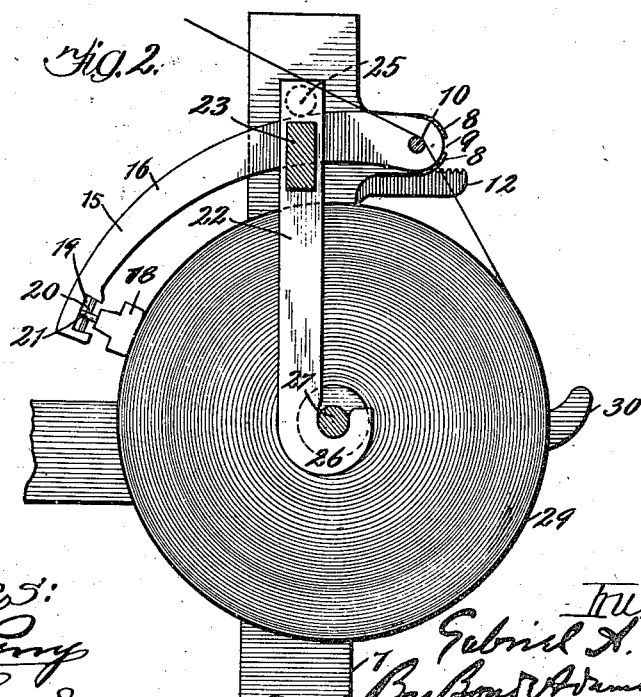

G. A. MENENDEZ.
BRAKE MECHANISM FOR WEB ROLLS.
APPLICATION FILED APR. 14, 1909.
1,028,244.
Patented June 4, 1912.
2 SHEETS—SHEET 2.
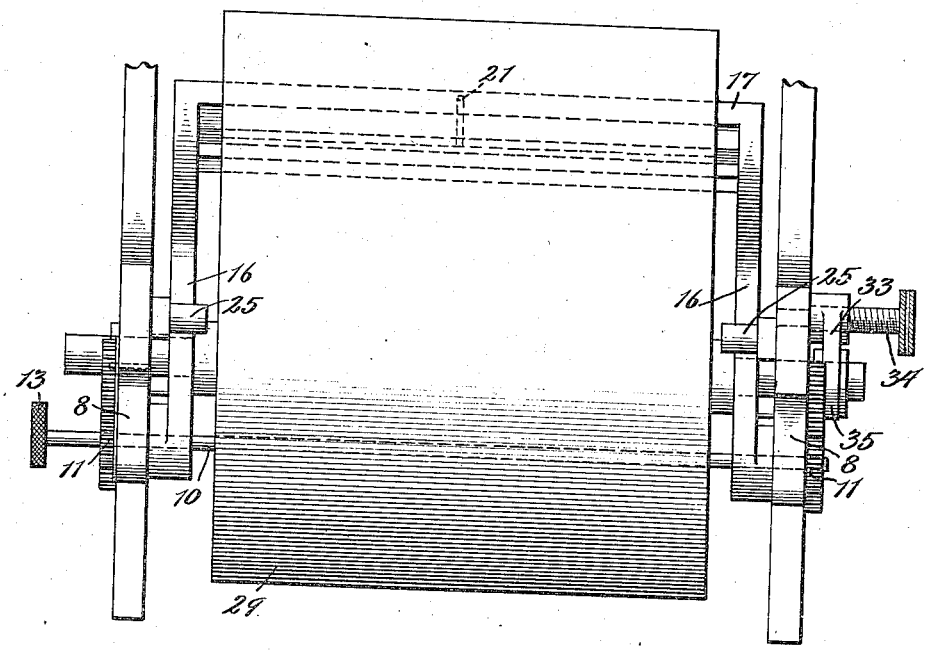
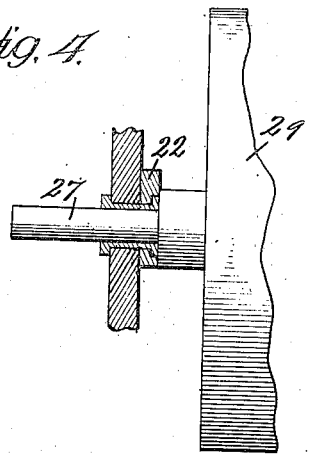
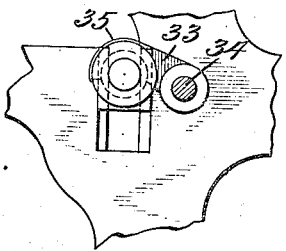
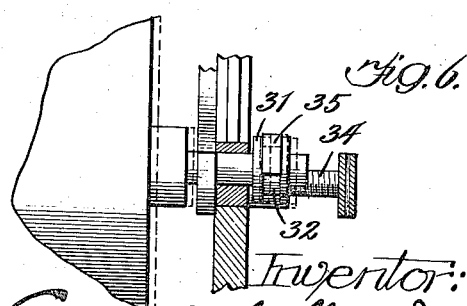
Witnesses:
Inventor:
Gabriel A. Menendez
By Bond, Adams, Pickard & Jackson
Attys

UNITED STATES PATENT OFFICE.

GABRIEL A. MENENDEZ, OF CHICAGO, ILLINOIS, ASSIGNOR TO THE GOSS PRINTING PRESS COMPANY, OF CHICAGO, ILLINOIS, A CORPORATION OF ILLINOIS.

BRAKE MECHANISM FOR WEB-ROLLS.

1,028,244.  Specification of Letters Patent.  Patented June 4, 1912.

Application filed April 14, 1909. Serial No. 489,929.

*To all whom it may concern:*

Be it known that I, GABRIEL A. MENENDEZ, a citizen of the United States, residing at Chicago, in the county of Cook and State of Illinois, have invented certain new and useful Improvements in Brake Mechanism for Web-Rolls, of which the following is a specification, reference being had to the accompanying drawings.

My invention relates to improvements in brake mechanism for web rolls of a printing press, and its object is to provide new and improved mechanism by means of which the brake may be applied directly to the periphery of the roll of paper, and in which the weight of the roll serves as the force by which the brake is applied to the roll.

In the accompanying drawings, Figure 1 is a side elevation; Fig. 2 is a side elevation with part of the frame removed; Fig. 3 is a top or plan view; Fig. 4 is a detail, being a top view of a portion of the web roll and a horizontal section through the frame showing the slide bearing of a roll hanger; Fig. 5 is a detail, being an end view of the adjusting mechanism; and Fig. 6 is a detail, being a side view of the adjusting mechanism partially in section.

Referring to the drawings,—7 indicates a portion of the roll-frame of a printing press.

8 indicates brackets—one upon each side of the frame—each provided with a slot 9.

10 indicates a shaft, which is located in the slot 9 in the brackets 8 so as to rotate freely therein.

11 indicates gears, one at one end and the other near the other end of the shaft 10.

12 indicates rack-bars, which are secured in any suitable manner upon the outer surface of the frame 7 so as to extend outward in the same direction as the brackets 8 and having their toothed surface parallel with the slots 9 and in register with the gears 11, so that by the rotation of the shaft 10 the gears, engaging the rack-bars 12, will cause the shaft 10 to move outward or inward in the slots 9.

13 indicates a hand-wheel, which is secured upon one end of the shaft 10, by means of which it may be turned for shifting its position in the slots 9, as above described.

14 indicates a lock-arm, which is pivoted upon the side of the frame 7 above the bracket 8 at one end of the press and is adapted to be swung down so as to engage one of the gears 11 upon the opposite side from the rack-bar 12 and, when so engaged, to prevent the rotation of the shaft 10 and hold it in position. When it is desired to shift the shaft, the lock-arm 14 is lifted away from engagement with the gear 11.

15 indicates a brake-frame composed of side bars 16 and end-bar 17. The side bars at their outer ends are mounted upon the shaft 10 by means of suitable openings through which the shaft 10 passes.

18 indicates a brake, which is mounted in the end-bar 17 of the brake-frame 15. The end-bar 17 is preferably slotted longitudinally with a slot 19, and the brake 18 is pivotally mounted therein by means of a longitudinal centrally-disposed lug 20 which is pivoted in the slot 19 by means of a pin 21. This construction is to allow the brake to automatically adjust itself in case the roll is slightly flattened at any point so as to make its diameter at one end—as frequently happens—slightly less than at the other, and this construction enables the brake-frame to bear across the entire periphery of the roll. It will be seen from the above description that the brake-frame 15 is pivoted on the roll-frame so as to swing on its pivot and allow the brake to keep constantly upon the surface of the roll as the roll diminishes from being fed into the press.

22 indicates hangers, which are slidingly mounted in the upright portions of the frame 7 by means of lugs 23 which move freely in slots 24 in the upright portion of the frame 7. The hangers are mounted immediately within and bear against the inner surface of the frame 7 and between the bars 16 and said frame.

25 indicates lugs, which are mounted upon or formed integral with the upper end of each hanger 22 and project inwardly therefrom over the side bars 16 so as to engage the upper surface of said sidebars. It will be obvious from the above that the hangers slide vertically in the frame by means of the lugs 23 in the slot 24 and are supported upon the side bars 16 of the brake-frame so as to rise and fall with said brake-frame. The lower end of each of the hangers is formed into a hook 26 which forms a journal adapted to receive and rotatably support the roll-spindle 27 of a paper roll. The frame 7 is provided upon each side with a vertically-extending slot 28, which is in register with the hook portion 26 of the hangers 23, and in which the ends of the roll spindle 27 may move vertically of the frame.

29 indicates a web roll of paper on the roll-spindle 27, which is adapted to be supplied to a printing press (not shown) in the well-known manner.

30 indicates roll-brackets, which serve as a support upon which the roll-spindle may be placed when putting the roll into position. The slots 28 are open at the top, as is best shown in Fig. 1, so as to permit the roll, when the roll-spindle is placed upon the brackets 30, to be rolled into the hooks 26 of the hangers 22 and into registry with the slots 28.

31 indicates a pulley, which is secured to one end of the roll-spindle outside of one of the roll-frame uprights 7 and is provided with a peripheral slot 32.

33 indicates an arm, which is provided at one end with a suitable screw-threaded opening through which a hand-screw 34 passes. The hand-screw 34 is screwed into the end-bar of the press. The other end of the arm 33 is provided with a hook 35 which is adapted to engage the slot 32 in the pulley 31. When so engaged it is obvious that the turning of the hand-screw 34 in one direction or the other will carry the arm 33 toward or away from the side of the press, and the hook thereon, being engaged with the slotted pulley 31, will move the web roll in one direction or the other for the purposes of lateral adjustment. When it is desired to remove the web roll, the arm 33 is simply swung back on the hand-screw so as to disengage the hook from the groove 32.

The operation of the above-described device is as follows: When the roll is placed in the press, it is laid upon the brackets 30 and rolled forward into position. Its periphery brought into contact with the brake will force the same outward, raising the hangers 23 into the position shown in Fig. 1; the parts being adjusted, of course, to the ordinary size roll. The roll then drops into the hooked ends of the hangers 22 with the roll-spindle in register with the slots 28. The whole weight of the roll is obviously thus supported upon the side arms of the brake-frame, and the weight of the roll serves as the force by which the brake is brought into contact with the periphery of the roll in order to brake it. As the web is used up and the roll diminishes in size it is obvious that the roll-spindle descends in the slots 28, the hangers moving downward with it, and, supported as they are wholly upon the brake-frame, the brake is kept in constant contact with the periphery of the roll until the roll is exhausted.

That which I claim as my invention, and desire to secure by Letters Patent, is,—

1. A roll-braking mechanism for printing presses having in combination a roll-frame, a brake-frame pivotally mounted on said roll-frame and having its pivots adjustable toward and away from said roll-frame, means for laterally adjusting said brake-frame, a hanger-frame suspended from said brake-frame between the pivotal point and the end of said brake-frame and adapted to carry a roll of paper, and a brake mounted on said brake-frame and adapted to bear upon the surface of said roll of paper.

2. A roll-braking mechanism for printing presses having in combination a roll-frame, a shaft mounted on said roll-frame and adjustable in positions parallel with each other toward and away from said roll-frame, means for adjusting said shaft, a brake-frame carried by said shaft, a hanger-frame adapted to support a roll of paper and suspended on said brake-frame at a point between said shaft and the other end of said brake-frame, and a brake mounted on said brake-frame and adapted to bear substantially throughout its entire length upon the surface of a roll of paper supported on said hanger-frame.

3. In a mechanism for braking rolls of paper, the combination with a roll-frame provided near its upper end upon each side with a horizontal slot, a shaft slidingly mounted in said slots and adjustable therein, means for adjusting the position of said shaft in said slots, a brake-frame carried on said shaft, a brake carried by said brake-frame and adapted to bear upon the periphery of the web-roll, vertical slots in said roll-frame, and roll hangers slidingly mounted in said slots in said roll-frame and supported at their upper ends on said brake-frame between the pivotal point of said brake-frame and said brake and adapted at their lower ends to rotatably support a web-roll.

4. In a mechanism for braking rolls of paper, the combination with a roll-frame provided near its upper end upon each side with a horizontal slot, two rack-bars one located alongside of each slot, a shaft mounted in said slots, pinions on the ends of said shaft engaging said rack-bars, and means for holding said shaft against rotation relative to said rack-bars and against movement longitudinally of said slots, of a brake-frame pivotally mounted on said shaft, a brake carried by said brake-frame, and a hanger-frame suspended from said brake-frame at a point between said shaft and said brake and adapted to carry a roll of paper, said brake being adapted to rest upon the roll of paper carried by said hanger-frame.

5. In a mechanism for braking rolls of paper, the combination with a roll-frame provided near its upper end upon each side with a horizontal slot, two rack-bars one located alongside of each slot, a shaft mounted in said slots, pinions on the ends of said shaft engaging said rack-bars, and a rack-bar pivotally mounted above one of said pinions and adapted to engage the same to prevent its rotation, of a brake-frame pivotally mounted on said shaft, a brake carried by said brake-frame, and a hanger-frame suspended from said brake-frame at a point between said shaft and said brake and adapted to carry a roll of paper, said brake being adapted to rest upon the roll of paper carried by said hanger-frame.

GABRIEL A. MENENDEZ.

Witnesses:
C. E. PICKARD,
M. A. HUNTER.